Sept. 2, 1969  F. STEFFENINI  3,464,450
DOUBLE-WALLED TUBULAR BODY AND DEVICES FOR MAKING SAME
Filed Feb. 7, 1967  4 Sheets-Sheet 1

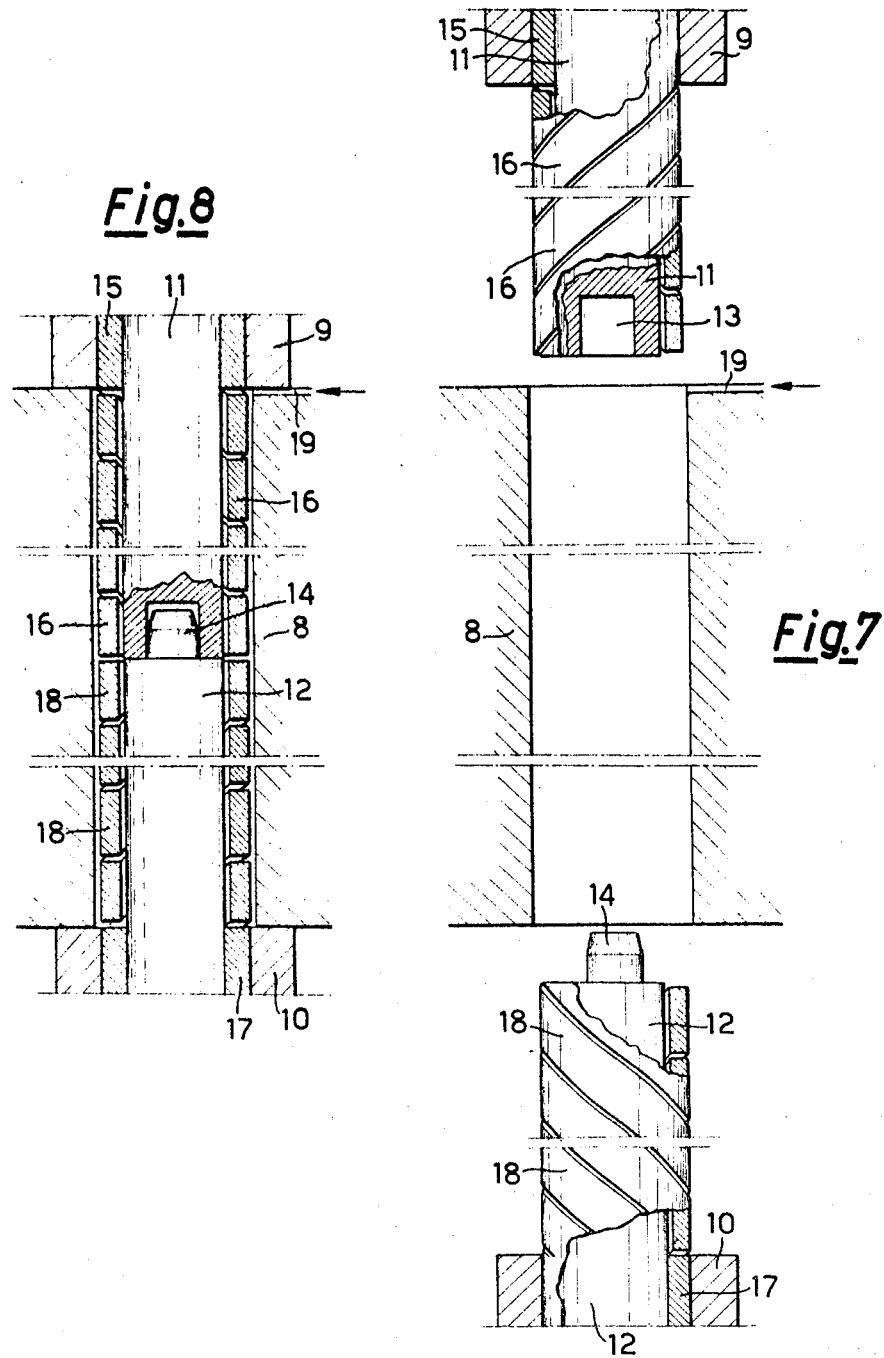

Sept. 2, 1969  F. STEFFENINI  3,464,450
DOUBLE-WALLED TUBULAR BODY AND DEVICES FOR MAKING SAME
Filed Feb. 7, 1967  4 Sheets-Sheet 3
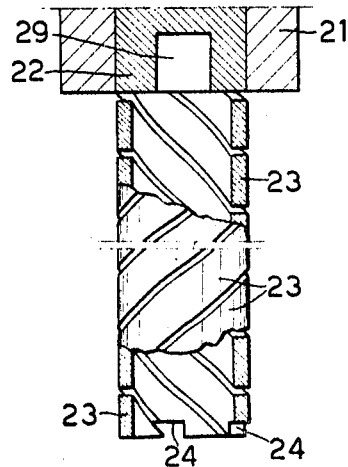
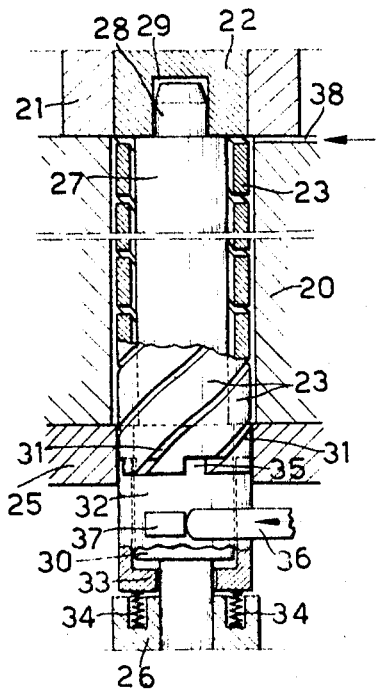
Fig.10
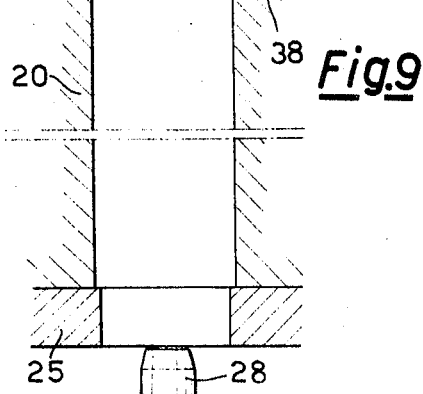
Fig.9
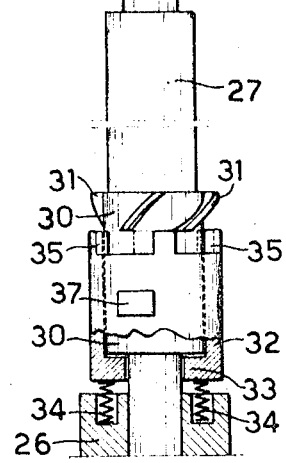

ns Patent Office 3,464,450
Patented Sept. 2, 1969

1

3,464,450
DOUBLE-WALLED TUBULAR BODY AND
DEVICES FOR MAKING SAME
Francesco Steffenini, Via Pizzi 28/32, Milan, Italy
Filed Feb. 7, 1967, Ser. No. 614,449
Claims priority, application Italy, Feb. 7, 1966,
2,611/66
Int. Cl. F16l 9/18, 9/04
U.S. Cl. 138—113                    4 Claims

ABSTRACT OF THE DISCLOSURE

A tubular body, comprising two coaxially arranged cylindrical walls and at least a helical reinforcing rib inserted therebetween is disclosed as having a high resistance to mechanical stresses, more particularly to radial compression and axial load stresses.

---

Figure 1:
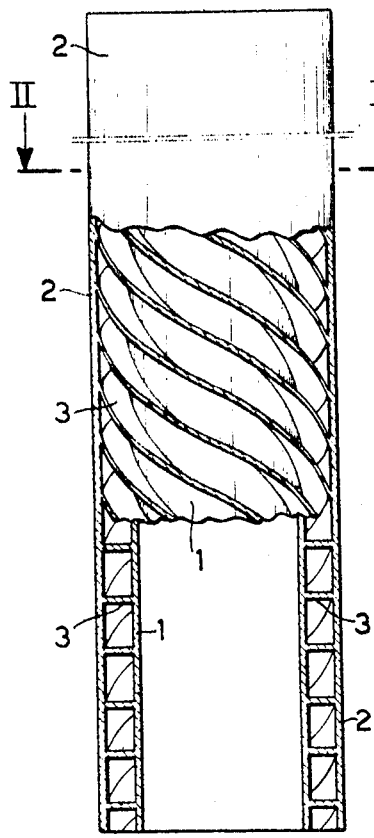

This invention relates to a double-walled tubular body and to apparatus for manufacturing the same.

The principal object of the present invention is to provide a tubular body having a very high resistance to mechanical stresses, and more particularly to radial compressive stresses and axial stresses.

Another object is to provide a tubular body which, while having the same weight and size of a tubular body made with the same material but in the conventionally known shapes, is considerably more resistant to mechanical stresses. Stated alternatively, the object can be said to be that of providing, with the same material, a tubular body having a novel structure and capable of exhibiting the same mechanical resistance of a tubular body of conventional shape but using a weight of material which is much less than conventionally used heretofore.

The foregoing and other objects, features and advantages are achieved by a tubular body comprising two coaxially arranged walls confined by surfaces of revolution having a circular cross-sectional area so as to define a cavity therebetween, and at least a rib integral with the two walls which is extended transversely and along a helical path within the cavity, with the axis of the helical path being the same as that of the wall surfaces.

Field tests have shown that such a tubular body has in actual practice, the material and the weight being the same, a mechanical resistance which considerably greater than that of a tubular member of known configuration having either a single or a composite sidewall.

It has been ascertained, conversely, that the present tubular body having a helical rib extending helically within the gap between the walls of the tubular body has, surprisingly, a mechanical resistance which is much higher than that which could be obtained by solidly connecting the two coaxial walls with rectilinear ribs extended longitudinally of and parallel to the axis of the body within the inter-wall cavity.

The present tubular body has a host of practical applications and a few of which will be outlined in the following.

It should be emphasized, however, that the structure of the tubular body per se achieves a few subsidiary technical advantages which, in some cases, may be of paramount importance.

One of these advantages is that in joining two sections of a tubular body having the same cross-sectional area, it is no longer necessary to tap the two adjoining ends of the sections so as to adapt such ends to be threadedly engaged by a screw-threaded fitting, nor is it necessary to expand an end of either section to overlap either end of the other section. On the other hand, the two sections of the tubular body can be joined or connected as fabricated, by means of a joining member having front helical ridges which are firmly threaded and fastened to the end portion of the helical ridges of each section in a quick easy fashion.

Another advantage is that when the tubular body is used for transferring dangerous fluids such as corrosive agents, the double wall serves to prevent leakages due to failure of the tubular body walls which is an important safety factor.

A further advantage which is of importance in the field of fluid conveyance is that the cavity between the walls of the tubular body can be used as a thermal insulation for a fluid moving within the body. The cavity can also be used to permit another fluid to be circulated therein whose temperature is such as to influence in either direction (i.e. raising or lowering) the temperature of the fluid flowing within the tubular body.

Figure 3:
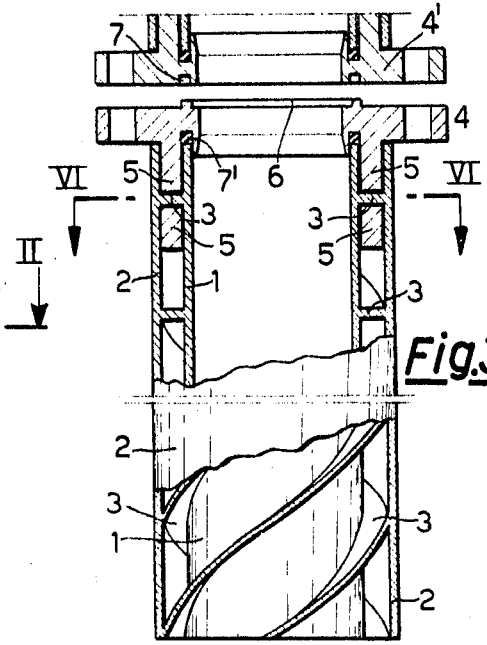
Figure 4:
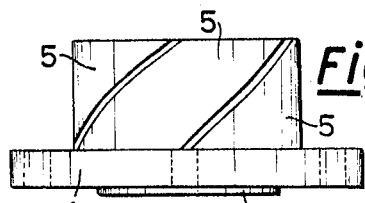
Figure 5:
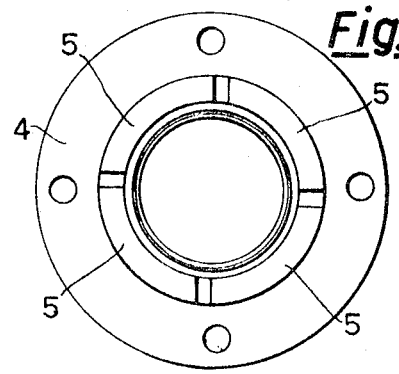
Figure 2:
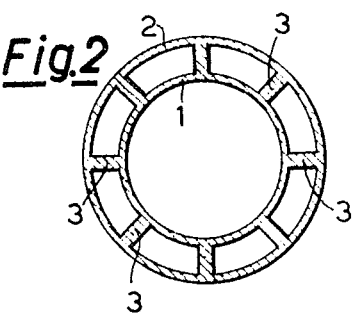
Figure 6:
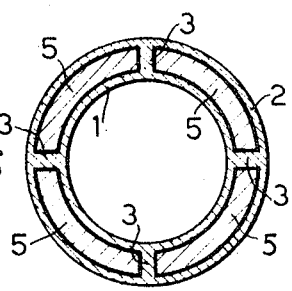
Figure 11:
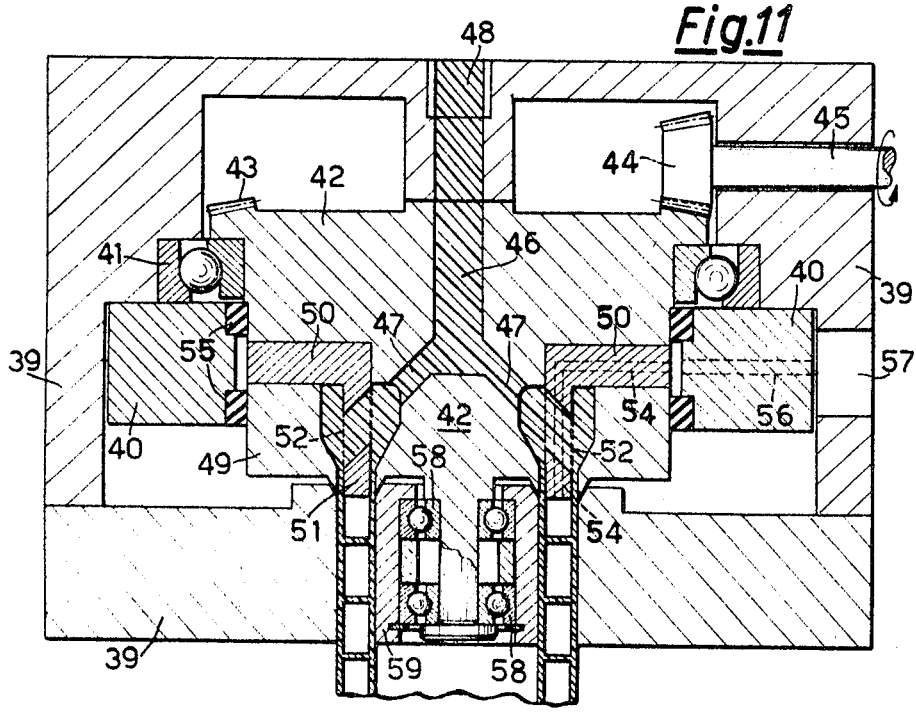
Figure 13:
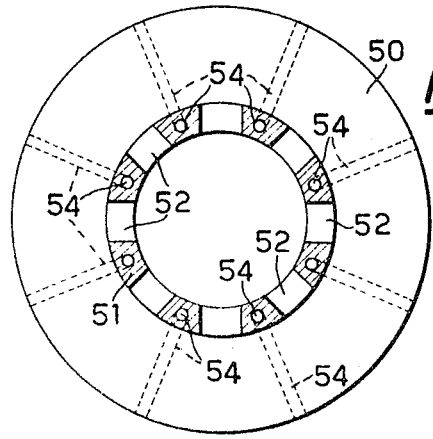
Figure 12:
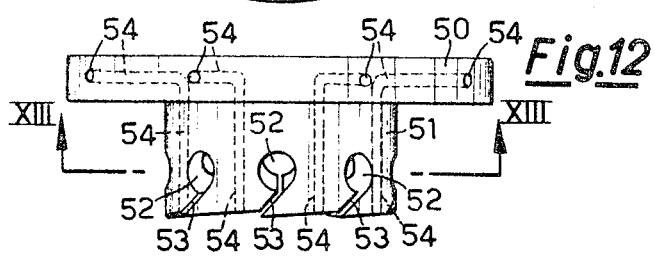

Further objects and advantages of the invention will become more readily apparent to persons skilled in the art from the following detailed description and annexed drawings and in which drawings:

FIG. 1 is a side view, partly broken away and partly in elevation and cross-section of the double-walled tubular body, FIG. 2 is a cross-sectional view taken along the line II—II of FIG. 1, the viewing looking in the direction of the arrows, FIG. 3 is a view similar to FIG. 1 showing a junction member mounted on one end of a tubular body section, FIGS. 4 and 5 are views in side elevation and in plan, respectively, of the junction member of FIG. 3, FIG. 6 is a cross-sectional view taken along the line VI—VI in FIG. 3, the view looking in the direction of the arrows, FIG. 7 is an exploded view partly in elevation and partly in cross-section of an apparatus for providing a double-walled tubular body, FIG. 8 is a view of the arrangement illustrated in FIG. 7 in the assembled condition, FIG. 9 is a view similar to FIG. 7 of a modified apparatus, FIG. 10 is a view similar to FIG. 8 of the apparatus disclosed in FIG. 9, FIG. 11 is an axial sectional view of a rotary extruder head for the continuous formation of double-walled tubular bodies having an indefinite length, FIG. 12 is a side elevational view of a member constituting a part of the extruder head shown in FIG. 11, and FIG. 13 is a cross-sectional view taken along the line XIII—XIII of FIG. 12, the view looking in the direction of the arrows.

Referring to FIGS. 1 and 2, it can be seen that a tubular body comprising two coaxial cylindrical inner and outer walls 1 and 2, respectively of a circular cross-section define therebetween a cavity. Moreover, the tubular body is provided with, in the example shown eight ribs 3, arranged in parallelism and integral with the walls 1 and 2 which extend radially and according to a helical path within the cavity defined by the walls 1 and 2. The axis of the helix coincides with axis which is common to both the curved walls.

The phrase "radially extending" has reference to the helical ribs which bridge the two walls 1 and 2, and should be construed to mean that each rib is confined by two surfaces which portions of two straight ruled helicoids. Stated alternatively, in each and every axial cross-section of the tubular body, the cross-section of the ribs defines a surface whose contouring line is not necessarily rectilinear, and whose axis is substantially perpendicular to the surfaces of the walls 1 and 2, as viewed in the top portion of FIG. 1.

As previously mentioned it has been possible to ascertain that a tubular body such as shown in FIGS. 1 and 2, exhibits surprisingly outstanding characteristics of resistance to mechanical stresses, and more particularly to radial compression and axial tension and compression. A theoretical elucidation of the reasons therefor is rather complicated and is not essential to a proper understanding of this invention.

A tubular body as shown in FIGS. 1 and 2 is susceptible of many-fold uses and can be used, for example, to contain electric cables, for circulation of fluids, and as such can be buried beneath a surface or roadway without having to be laid at great depths and enclosed within a protection sheath as presently conventionally used. This is due to the fact that the present tubular body is capable of withstanding without danger of failures the heavy weights of vehicles moving along the roadway.

Another important use can be found in the textile field in which it is conventional to wind synthetic yarns of metal tubes to form cops. The use of metal tubes is customary at the present time since synthetic yarns impress a considerably high pressure on the tubes on which they are wound which tends to crush the tubes.

The disadvantage of the metal tubes is that such tubes are both expensive and heavy, and which factors have a considerable bearing on the cost of the yarn. To appreciate such factors, it is sufficient to consider that the tube weight adds considerably to the transportation. Hence custom clearance expenditures and the high initial cost of such tubes is such as to obligate manufacturers to call such tubes from the customers after use and the returned tubes ultimately entail further expenditures since the tubes must undergo costly upkeep operations and accounting entries as is known to those skilled in the art.

If the yarn-supporting core is of the type comprehended by the invention, a much lighter core than was hitherto possible can be obtained and which core is extremely sturdy. These advantages are obvious, but, in addition, it has been ascertained by field tests that a yarn cop supporting core of a plastic material can be satisfactorily adopted and is much lighter and cheaper than the conventional cores so that such core can be mass-produced in the "not-to-be-returned" type, thereby eliminating the expenditures attendant to the previously used cores.

It should be recalled however that the base portion of the conventional cores requires a socket being applied thereto for engaging the base of the spinning spindles. This socket adds to the cost of the core, whereas the present tubular body can be directly rotated by teeth provided at the spindle base for engaging the helical rib ends.

Such a tubular body can be utilized as a pillar-like structural component, i.e. a body adapted to withstand axial pressure, and can also be used for providing tubular scaffoldings, as a fluid conveying pipe and in many other ways.

In any event, any structure constituted by tubular bodies according to this invention will prove much lighter than a correspondingly strong structure made with the same material in the conventional way.

The immediate favorable result is that certain structures, which, according to the teachings of the prior art, had to be constructed with costly and heavy materials, such as iron and other metals, to ensure the desired robustness, can now be cheaply and easily fabricated with other lightweight materials, such as synthetic resins, without sacrificing in any fashion the mechanical strength of the structures. This is due to the novel structure of the tubular bodies with the inner helical reinforcing ribs and which is particularly evident in the supporting cores for yarn cops. The tubular body, however, can be obtained from any starting materials, such as metals, ceramics, glass, et cetera as well as the mentioned plastic materials.

As disclosed, the helically ribbed tubular body permits the joining or connecting operations of two adjoining tubular bodies to be effected in a rapid and easy manner, and such junction is reliable under any working conditions, as compared with the prior art bodies in which the junctions always presented a problem or a weak point.

For convenience of illustration, the same reference numerals used in FIGS. 1 and 2, have been repeated in FIGS. 3 to 6 to indicate corresponding parts. However, the tubular body in FIGS. 3 to 6, comprises four helical ribs 3 arranged in parallelism with respect to one another, instead of the eight ribs shown in FIGS. 1 and 2.

The joining or connecting member shown in FIGS. 3 to 6 comprises a circular flange 4 and four front projections 5 having a helical outline whose pitch is the same as that of the ribs 3. The distance between the helically shaped edge of each projection and the edge of the adjoining projection is substantially equal to the thickness of the ribs 3. Thus, by bringing the free end of the projections 5 to an end of the tubular body, it is possible to insert the ribs 3 in the spaces between adjoining projections to cause the projections 5 to enter and advance one in each space as confined in the tubular body by the walls 1 and 2 and by two adjoining ribs 3. In other words, the joining member is threaded onto the end of the tubular body and is clamped therein in the position shown in the upper portion of FIG. 3. It can thus be understood that the mounting of the joining member on the tubular body is a rapid, safe and precise operation which does not weaken in any manner the end of the tubular body. Two joining members can be affixed to one another in any conventional manner, such as by bolts inserted therein and thereafter tightened in bores provided through the circular flange 4 of each joining member.

Seal-tight members can be inserted between the facing flanges of the two joining members which are sequentially connected together. Other seal-tight members can be inserted between the tubular body and the joining member, and one of such seal-tight members is shown at 7' in FIG. 3. Also, an annular bead 6 can project from the flange 4 and if such is the case face flange 4' of the adjacent joining member should be provided with an annular groove 7 corresponding to that of the bead 6 of the flange 4'.

It is obvious that helically profiled front protrusions or the like can project in opposite directions from the planar surfaces of the circular flange and if such is true, a single joining member is sufficient to connect two tubular bodies. Upon threading the joining member on one end of a first tubular body by using the front projections provided on a face of the flange, a second tubular body could be threaded onto the front projections on the other face of the flange.

One apparatus adapted for the discontinuous (i.e. by single pieces) production of tubular bodies having a discrete length is shown in FIGS. 7 and 8.

The apparatus comprises a female mold part 8 defining a cylindrical cavity at the two sides of which are provided two bodies 9 and 10 which are integral with the movable parts of a press (not shown), and which can be displaced with respect to one another along a rectilinear path, which faces and is coaxial with respect to the axis of the cylindrical cavity. To the bodies 9 and 10 are affixed two cylindrical members 11 and 12, respectively, each having a circular cross-section and a diameter equal to the inner diameter intended for the tubular bodies to be produced. The free end of the cylindrical member 11 is formed with a cylindrical space 13, whereas an axial cylindrical boss 14 having a configuration corresponding to the space 13 is provided on the free end of the cylindrical member 12. When the bodies 11 and 12 are displaced towards one another, the boss 14 enters the space 13 as shown in FIG. 8. Between the body 9 and the cylindrical member 11 is provided a tubular member 15 from which project and extend coaxially with said cylindrical member 11 four helical ribs 16 in spaced relationship with respect to the cylindrical member 11. A generally similar manner a tubular member 17 is provided between the body 10 and the cylindrical member 11 and from which project four helical ribs 18 extending in a direction opposite to that of the ribs 16.

To obtain a tubular body, the two bodies 9 and 10 are moved together by inserting the cylindrical members 11 and 12 with their projections 16 and 18 into the female mold cavity 8 so that the facing ends of the cylindrical members 11 and 12 are maintained in pressure engagement. Under these conditions, as shown in FIG. 8, the bodies 9 and 10 close the two end openings of the female mold 8, with a gap 19 being provided therebetween and through which gap a molten material, such as a thermoplastic resin, can be introduced in the direction shown by the arrow. Of course, all the conventional technological expedients adapted to fill the mold cavity rapidly and completely can be employed. Also, it is likewise obvious that conventional means for preheating and then cooling the injected plastic material can be employed.

The injected plastic material will thus fill the gap between the member 11 (and 12) and the inner surface of the ribs 16 (and 18) as well as the gap between the female mold surface 8 and the outer surface of the ribs 16 (and 18), along with the gap between a helical projection and its adjoining projection. As can readily be seen, the plastic material in the mold assumes a configuration which is similar to that of the tubular body shown in FIG. 3, with the only difference being that the helical winding of one half of the tubular body is right-handed, and the other half left-handed. Once the plastic material in the mold has set, the bodies 9 and 10 are withdrawn from the female mold 8 so as to disengage the ribs 16 and 18 from the helical ribs of the molded tubular body. To achieve this end, the bodies 9 and 10 are rotatably mounted about the axis of the mould, and movable parts are provided in the press platen.

If the thus produced tubular body has a reduced length and its ribs have a comparatively long pitch, the bodies 9 and 10 can be mounted in an idle fashion on the press platens. Hence the rotation of the bodies 9 and 10 and their attendant ribs 16 and 18 will take place simultaneously as the bodies 9 and 10 are being withdrawn from one another. In the negative, the rotation of the bodies 9 and 10 could be effected either manually or mechanically with means which are well within the purview of anyone skilled in the art.

As indicated, the above described apparatus is adapted for the discontinuous production of tubular bodies having a discrete length. In this connection, it should be noticed that the helical ribs 16 and 18 overhangingly project from the tubular members 15 and 17, respectively and, due to their limited length, will retain a stiffness which is sufficient to maintain an adequate and well defined static position when the molten material is injected in the mold.

The apparatus to be described is well suited for the production of tubes, cores and spindles for supporting yarn cops, reels, drums, rollers and other items having considerable dimensions in the transverse direction. The apparatus shown in FIGS. 7 and 8 would be inadequate for the production of tubular bodies having a considerable length, inasmuch as the stiffness of the helical ribs 16 and 18 would be insufficient to withstand the injection and setting of the molten material from which the tubular body is made.

When tubular bodies of considerable length are to be produced in a discontinuous manner, the apparatus shown in FIGS. 9 and 10 is employed. The apparatus comprises a female mold 20 having a cylindrical cavity. A body 21 which is rotatably mounted on a movable part of a press (not shown) is provided on one side of the cavity and by virtue of the movable part, the body 21 can be rectilinearly translated coaxially with the axis of the cavity. The body 21 and the mold 20 are similar to those shown in FIGS. 7 and 8 and indicated therein at 9 and 8, respectively. A member 22 is affixed to the body 21 and from which project and are extended four helical projections or ribs 23 similar to those indicated at 16 and 18 in FIGS. 7 and 8. The only difference is that at their free end, the projections 23 have a stepped portion 24 whose function will clearly appear hereinafter.

As viewed in FIG. 9, the lower portion of the mold 20 has a plate 25 provided with a circular bore formed coaxially with the mold cavity 20 and having a diameter less than that of the cavity.

Externally of the bore of the plate 25 a body 26 is provided which is also integral a movable portion of a press and which can also be rectilinearly translated coaxially with the axis of the mold cavity 20. To the body 26 is integrally affixed a cylindrical body 27 having at its free end a boss 28. The boss 28 can be housed (FIG. 10) in the conditions of use of the apparatus, in a cavity or space 29 having a shape complementary thereto and formed in the member 22. In the neighbourhood of the body 26, the cylindrical body 27 has a cylindrical portion 30 whose diameter is greater than that of the cylindrical body 27. From the upper portion of the cylindrical portion 30 project four teeth 31 having a helical profile of uniform direction and a pitch equal to that of the projections 23. Their transverse thickness is such as to allow the same to enter the gap existing between the helical projections or ribs 23 (FIG. 10).

Above the cylindrical portion 30 is mounted in freely rotatable and translatable fashions a bushing 32 which has edge 33 at its bottom and against which one end of springs 34 positioned in an inturned the body 26 abut. The bushing 32 is not biased by the springs 34 beyond the position shown in FIG. 9 since the edge 33 abuts the lower edge of the cylindrical portion 30 (FIG. 9). From the upper portion of the bushing 32 project four front teeth adapted to engage the steps 24 of the helical projections 23 (FIG. 10).

To obtain a tubular body with the above described apparatus, the body 21 is displaced, by operating the press toward the mold 20, thereby causing the helical projections 23 to enter into the cavities of the mold 20 until the body 21 rests on the adjacent surface of the mold (FIG. 10). By virtue of the press, the body 26 is then caused to advance with its attendant parts supported thereby towards the body 21, thus causing the cylindrical body 27 to enter into the cylindrical gap confined by the helical projections 23. During the approaching movement of the body 26 toward the body 21, at a certain stage, the teeth 31 will contact the end portions of the helical projections 23 and will be inserted into the space existing between a projection such as 23 and the adjoining projection thus causing, during the advance, a rotation of the projections about their own axes until the front teeth 35 come in registry with the steps 24 (FIG. 10).

At this stage, by means of a pawl mechanism diagrammatically shown in FIG. 10 and indicated at 36, a tooth 37 formed peripherally of the bushing 32 is engaged. A single tooth such as 37 has been shown in the drawings, but, in actual practice, a plurality of such teeth 37 can be formed angularly spaced apart so as to form a toothed ring. As the pawl 36 is shifted in the direction of the arrow, the tooth 37 is shifted towards the left and the bushing 32 is caused to rotate over the cylindrical portion 30. During this rotation, the teeth 35 engage the steps 24 thus imparting a twist to the helical projections 23 (during this stage the rotation of body 21 is prevented) whose lower ends are clamped on the cylindrical portion 30 and which vary (even though slightly) their slope so as to thrust downward, and in turn, the bushing 32 against the action of the springs 34.

Under these conditions (shown in FIG. 10) the helical projections 23 are taut and stiffened, with their inner surface being spaced apart from the surface of the cylindrical body 27. The same do not undergo any displacement when, through an annular gap 38 provided between the body 21 and the mold surface 20, a molten material is injected in the mold. As can be seen in FIG. 10, the transverse dimensions of the circular bore formed through the plate 25, equal those of the bushing 32 and the cylindrical surface which wraps the outer surface of the helical projections 23 which are caused to adhere to the cylindrical portion 30 by the action of the front teeth 35. The tubular body which is formed in the apparatus is entirely above a plane passing through the upper surface of plate 25 and has a shape the equivalent of that of the tubular body shown in FIG. 3. As soon as the material injected into the mold has set, the pressure of the pawl 36 on the tooth 37 is released, and the body 21 is allowed to rotate again and the helical projections 23 with the cylindrical body 27 are removed from the cavity of the mold. The latter projections undergo an axial rotation in the first stage of the withdrawal movement of the body 21 from the body 26 until the teeth 31 have not been disengaged by the same projections 23. As they are removed from the mold cavity, the helical projections draw out of the mold the molded tubular body, which is subsequently disengaged from the helical projections by causing the projections to be rotated either manually or mechanically as the several component parts of the machine have been withdrawn from one another.

An apparatus will be now described for the continuous production of tubular bodies having an indefinite length, and reference is directed to FIGS. 11 to 13. More precisely, the description will be confined to the component parts shown in the drawings, which compose a rotary extruding head and the extruder head is associated in the apparatus with a member, such as a screw press of conventional construction adapted to displace molten material upstream of the extruding head to a calibrating and cooling device for the extruded tubular body located downstream of the extruder head as disclosed in British patent specification No. 780,900 and in the U.S. Patent No. 2,519,375.

The extruder head shown in FIG. 11 comprises a frame 39 having an inner cavity in which is housed in a fixed position an annular body 40 which supports a ball bearing 41. The bearing 41 in turn supports a spinneret 42 freely rotatable about its axis and having at its top end a crenellated ring 43 the teeth of which engage those of a pinion 44 integral with a shaft 45. The shaft 45 is connected to and driven by a motor (not illustrated).

In the spinneret 42 and coaxial therewith is provided a main duct 46 which is branched into a number of secondary ducts 47 on its bottom part as viewed in FIG. 11. Above the spinneret 42, the duct 46 is extended into a bore 48 coaxial therewith and formed through the frame 39, and the bore is directly connected to the outlet of the member which transmits the molten material and which is indicated herein as a screw press for thermoplastic materials.

To the spinneret 42 is integrally affixed an annular body 49 having the shape shown in FIG. 11. Between the spinneret 42 and the body 49 is integrally affixed a body defined by a disc 50 having a tubular extension 51.

A plurality of perforations 52 are formed through the tubular extension 51 to allow the plastic material emanating from the ducts 47 to fill completely an annular cavity defined inside and outside the tubular extension by the facing surfaces of the spinneret 42 and the body 49. Each perforation 52 extends into a sloping or inclined groove 53 (FIG. 12) down to the lower edge of the tubular extension 51. In the disc 50 are formed a plurality of perforations 54, which extend throughout the whole length of the tubular extension 51. The outer peripheral edge of the disc 50 is spaced from the inner peripheral edge of the annular body 40 so as to form an annular chamber which is closed at the top and bottom by two annular sealtight members 55 so as to prevent leakages of pressurized fluid as will be explained hereinafter. At least one bore 56 is formed through the annular body 40 for establishing a communication between the annular chamber and a bore 57 formed through the casing 39 and which is connected to a source of pressurized fluid, such as compressed air (not shown). The fluid is intended, as will become apparent, for contributing towards the cooling of the tubular body produced and prevent the walls of the tubular body from becoming flabby while still in the plastic condition.

As can be seen in FIG. 11, the outer surface of the bottom portion of the spinneret 42 and the inner surface of the tubular extension 51, and, on the other hand, the inner surface of the lower edge of the body 49 and the outer surface of said tubular extension 51 are spaced apart so as to confine two cylindrical gaps having a shape the equivalent of that of the tubular body to be produced in question. On the lower portion of the spinneret 42 are mounted bearings 58 which support an annular body 59 having an outer cylindrical surface whose shape and size are the same as those of the tubular body to be produced.

During the operation of the apparatus, the spinneret 42 is maintained in constant rotation by the driven pinion 44. By means of a screw press, a molten thermoplastic material is fed and forced through the bore 48, the ducts 46 and 47 to fill and be advanced through the bores 52 and the sloping grooves 53 of the tubular extension 51 and the annular cavity defined inside and outside of the tubular extension by the facing surfaces of the spinneret 42 and the body 49.

Between the tubular extension 51 and the lower portion of the surface of the spinneret 42 and the body 49, the plastic material is extruded in the form of continuous cylindrical walls which are connected, in the example shown, by eight helical ribs generated by the extruded material through the sloping grooves 53 of the tubular extension 51 rotatable with the spinneret 42. The inner and the outer surfaces of the tubular body as produced (which is continually fed forward without rotating with respect to the frame 39) creep against the surfaces of the frame 39 and the annular body 59 (whose rotation is impeded by the friction of the material being extruded) and are kept close to the surfaces by the pressurized fluid introduced through the bore 57 and the perforations 54 to prevent the tubular body from becoming flabby. Upon leaving the extruding head, the tubular body enters a cooling and calibrating assembly of conventional make, such as disclosed in British Patent No. 780,900 and U.S. Patent No. 2,519,375.

Once the tubular body has been cooled, it can be severed into sections of any desired length.

This invention is not to be confined to any strict conformity to the showings in the drawings but changes or modifications may be made therein so long as such changes or modifications mark no material departure from the spirit and scope of the appended claims.

The embodiments of the invention in which an exclusive property or privilege is claimed are defined as follows:

1. A tubular body comprising two concentric walls defined by surfaces of rotation and having a circular cross sectional area so as to define a gap therebetween and at least two ribs having helicoidal axes and an inclination with respect to the longitudinal axis of the body of at least 15 degrees integral with and interconnecting said two walls.

2. The tubular body according to claim 1, wherein said ribs are radially extended within said tubular body.

3. The tubular body according to claim 1, wherein said ribs are continuous and extend in a uniform direction along the whole length of said tubular body.

4. The tubular body according to claim 1, wherein said ribs are extended in one direction along a portion of the length of the tubular body and in the opposite direction along the remaining portion of length of said tubular body.

(References on following page)

References Cited

UNITED STATES PATENTS

| | | | |
|---|---|---|---|
| 813,918 | 2/1906 | Schmitz | 138—114 |
| 1,023,530 | 4/1912 | Schofer | 138—114 |
| 1,677,714 | 7/1928 | Frease | 138—172 X |
| 2,145,244 | 1/1939 | Berg et al. | 138—172 X |
| 3,110,754 | 11/1963 | Witort et al. | 138—114 X |
| 3,326,244 | 6/1967 | Charles et al. | 138—114 |
| 3,332,446 | 7/1967 | Mann | 138—114 |
| 3,379,221 | 4/1968 | Harry et al. | 138—172 |

FOREIGN PATENTS 85,856  10/1921  Austria.

HOUSTON S. BELL, Jr., Primary Examiner

U.S. Cl. X.R.

138—172